United States Patent
Kenjora (10) Patent No.: US 8,602,440 B2
(45) Date of Patent: Dec. 10, 2013

(54) MULTIFUNCTION TOW HITCH

(76) Inventor: Kazimierz Kenjora, Phoenix, AZ (US)

(*) Notice: Subject to any disclaimer, the term of this patent is extended or adjusted under 35 U.S.C. 154(b) by 57 days.

(21) Appl. No.: 13/099,213

(22) Filed: May 2, 2011

(65) Prior Publication Data

US 2011/0266775 A1    Nov. 3, 2011

Related U.S. Application Data

(60) Provisional application No. 61/330,587, filed on May 3, 2010.

(51) Int. Cl.
*B60D 1/00* (2006.01)
*B23P 11/00* (2006.01)

(52) U.S. Cl.
USPC .............................................. 280/504; 29/428

(58) Field of Classification Search
USPC ............. 280/491.5, 491.1, 491.2, 163, 164.1, 280/166, 491.3, 541, 45, 504, 511; 224/519, 520, 521; 29/428
See application file for complete search history.

(56) References Cited

U.S. PATENT DOCUMENTS

| | | | |
|---|---|---|---|
| 5,649,656 A * | 7/1997 | Davy | 224/405 |
| 5,794,959 A | 8/1998 | Scheef, Jr. | |
| 6,142,502 A * | 11/2000 | Breslin | 280/506 |
| 6,722,380 B1 * | 4/2004 | Hafer | 135/16 |
| 7,661,693 B1 | 2/2010 | Lipski | |
| 2005/0006874 A1 | 1/2005 | Mrofka et al. | |
| 2006/0163843 A1* | 7/2006 | Wooten | 280/511 |
| 2010/0294819 A1* | 11/2010 | Spera | 224/519 |

* cited by examiner

*Primary Examiner* — Tony Winner
*Assistant Examiner* — Jacob Knutson (57) ABSTRACT

A system and method for a hitch is presented. A center member is configured to mount to a receiver of a vehicle. A first arm is coupled to center member and configured to mount to the receiver of the vehicle. The first arm includes first and second receiver mount channels for mounting the first arm to the receiver in first and second mounting positions. A second arm is coupled to the center member. The second arm includes an accessory mount configured to provide a step when the first arm is mounted to the receiver in a first position and support an accessory when the first arm is mounted to the receiver in a second position.

9 Claims, 6 Drawing Sheets

*Fig. 1*

-PRIOR ART-

MULTIFUNCTION TOW HITCH

CROSS-REFERENCE TO RELATED APPLICATIONS

This application claims priority to, and incorporates herein by reference, U.S. Provisional Patent Application No. 61/330,587, entitled "Multifunction Hitch-Mounted Device", filed on May 3, 2010.

FIELD

The present invention is directed toward a tow for use with vehicles and, more particularly, to a trailer tow hitch assembly which may be mated to a receiver in multiple configurations or orientations to provide different functions, such as serving as an umbrella holder, a bicycle carrier mount, a step, or a multi-height ball mount.

BACKGROUND

A tow hitch is a device that attaches to a passenger vehicle, such as a car, truck or sport utility vehicle (SUV). The tow hitch serves as an attachment point, allowing the passenger vehicle to securely connect to and tow any number of wheeled attachments, including a recreational vehicle (RV), a travel trailer, a flat bed trailer, or another passenger vehicle, for example. The trailer hitch is typically bolted or connected to the chassis of the passenger vehicle to provide a secure point of attachment and to enable the passenger vehicle to safely tow large loads.

Trailer hitches generally come in two varieties: fixed drawbar and receiver-type. A fixed drawbar trailer hitch consists of a single assembly with a fixed tow attachment point, such as a trailer ball or an attachment point for a trailer ball. Fixed drawbar trailer hitches are typically designed for a single purpose and single configuration and, as such, are not configurable in terms of height or attachment options. For example, a fixed drawbar trailer hitch used to tow a boat, which requires a specific hitch connection height, cannot be used to tow a horse trailer that requires a different hitch connection height.

A receiver-type trailer hitch typically attaches to the chassis of the passenger vehicle in the same manner as a fixed drawbar trailer hitch. A receiver-type hitch, however, contains a standard attachment point, or receiver, that allows the interchange of a variety of different attachment options, in addition to a trailer ball. For example, in order to tow different trailers requiring different hitch connection heights, a different tow attachment providing the appropriate rise or drop to achieve the required hitch connection height mates with the receiver. The receiver is typically a square sleeve of a standard size that accepts an attachment. A pin slides through a set of holes in the receiver and a matching set of holes in the attachment to secure the attachment.

Trailer hitches in North America are classified by the size of the trailer they can safely tow. Two values classify trailer hitches: the carrying weight and the tongue weight. The carrying weight is the weight of the trailer itself. The tongue weight is the force exerted downward on the hitch by the trailer at the attachment point.

The standard classification for trailer hitches is defined by the Society of Automobile Engineers (SAE). Common classifications include Class I, II, III, IV, and V. Carrying weight ranges from 2,000 lbs for Class I to 12,000 lbs for Class V trailer hitches. Similarly, tongue weights range from 200 lbs for Class I to 1,200 lbs for Class V trailer hitches. For receiver-type trailer hitches, the size of the receiver typically varies by class and is determined by measuring the receiver opening. Classes I and II typically have a 1.25 inch receiver (an opening of 1.25 inches measured in each direction). Classes III, IV, and V typically have a 2 inch receiver, although Class V hitches may a 2.5 inch receiver.

In addition to serving as an attachment point for towing, receiver-type trailer hitches may attach a variety of accessories for other purposes. For example, at times, the need arises to transport one or more bicycles by passenger vehicle. For most vehicles, such as cars, it is not desirable to transport the bicycles in the interior of the vehicle. Instead, a bicycle mount attachment appropriately sized and adapted to couple with a receiver-type trailer hitch can be used to securely transport the bicycles on the outside of the car. Similarly, a receiver-type trailer hitch can be used mount a gas grill specially adapted to couple with a receiver-type trailer hitch. Such an arrangement allows both for transportation of a full size gas grill, which would otherwise be difficult to cleanly and safely transport, but also provides physical support when operating the grill, which obviates the need for a separate grill stand.

Despite the flexibility of receiver-type trailer hitches to accept a wide variety of attachment accessories, one difficulty is that each accessory is specialized for a specific purpose and each accessory is typically bulky. This generally limits the use of accessories on a given trip because extra accessories are generally hauled within the vehicle, taking up valuable space.

Vehicles equipped with receiver-type trailer hitches are commonly used for many activities including tailgating. Tailgating is a common social activity in the United States and involves gathering on or around the open tailgate of a vehicle, typically a pickup truck, SUV, or van, but also cars, RVs, and busses. As tailgating is generally an outdoor activity, rain and other poor weather is usually a concern. In cases of poor weather, tents or umbrellas provide shelter for the tailgating participants. One problem, however, is providing a secure means of supporting the tent or umbrella.

In addition to tailgating, pickup trucks are often used for a variety of purposes, including hauling and transporting anything from dirt to furniture. Pickup truck beds are typically raised off the ground to such a degree that it is not easy to step into the truck bed. Instead, to enter the truck bed, one must typically climb into the truck bed using an open tailgate, or climb over the side wall of the truck bed, or climb over the closed tailgate.

It would, therefore, be desirable to have a single apparatus capable of being attached to a standard receiver-type trailer hitch that would perform multiple functions, such as serving as an adjustable towing attachment, a bike carrier mount, a step for entering the pickup truck bed, and an umbrella holder.

SUMMARY

A multifunction hitch device is presented. In one implementation, the present invention is a hitch, comprising a center member configured to mount to a receiver of a vehicle, a tow ball coupled to the center member, and a first arm coupled to center member. The first arm is configured to mount to the receiver of the vehicle. The first arm includes first and second receiver mount channels for mounting the first arm to the receiver in first and second mounting positions. When the first arm is mounted to the receiver in the first mounting position, the center member is positioned parallel to a ground surface, and when the first arm is mounted to the receiver in the second mounting position, the center member is positioned perpendicular to a ground surface. The hitch includes a second arm coupled to the center member. The second arm includes an accessory mount configured to provide a step when the first arm is mounted to the receiver in the first mounting position and support an accessory when the first arm is mounted to the receiver in the second mounting position.

In other implementations, the present invention is a hitch comprising a center member configured to couple to a vehicle, a tow ball coupled to the center member, and a first arm coupled to center member. The first arm is configured to mount to the vehicle. The hitch includes a second arm attached to the center member. The second arm includes an accessory mount configured to support an accessory when the first arm is mounted to the receiver.

In other implementations, the present invention is a method of making a hitch. The method includes forming a hole through a first length of square tubing, forming a first arm and a second arm by cutting the first length of square tubing along a length of the hole, and mounting the first arm to a center member. The center member being sized to mount to a receiver of a vehicle. The method includes mounting the second arm to the center member, and connecting an accessory mount to the second arm.

DETAILED DESCRIPTION

The present invention is described in one or more embodiments in the following description with references to the Figures, in which like numerals represent the same or similar elements. While the invention is described in terms of the best mode for achieving the invention's objectives, it will be appreciated by those skilled in the art that is it intended to cover alternatives, modifications, and equivalents as may be included within the spirit and scope of the invention as defined by the appended claims and their equivalents as supported by the following disclosure and drawings.

Figure 1:
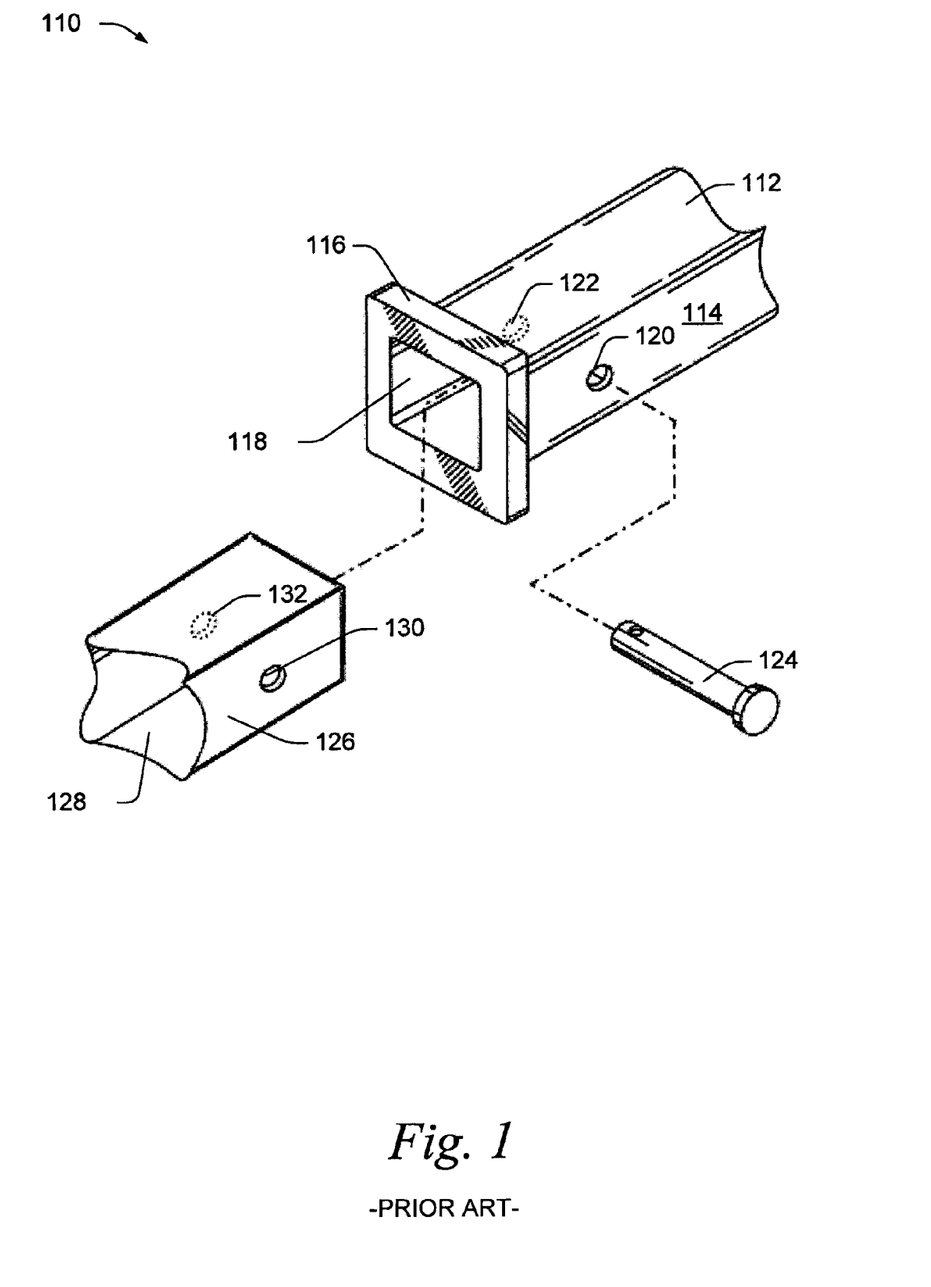
FIG. 1 illustrates a standard trailer hitch receiver.

Turning to FIG. 1, a conventional trailer hitch receiver is illustrated. The receiver 110 is the attachment point of a larger receiver-type trailer hitch. The receiver-type retailer hitch is typically mounted to the chassis of a vehicle. The vehicle may be a car, truck, SUV, bus, golf cart, or other type of wheeled vehicle suitable for towing another vehicle or object. Only the receiver 110 portion of a receiver-type trailer hitch is depicted in FIG. 1, as indicated by the broken line 112.

The receiver 110 comprises of a square tubular body 114. The interior of the tubular body 114 is hollow. One end of the tubular body 114 is connected to the body of the receiver-type trailer hitch. The opposite end of the tubular body 114 is framed with a flange 116. The flange 116 defines a square opening 118. The opening 118 is generally one of a number of standard sizes, which have a horizontal and vertical dimension ranging, for example, from 1.25 inches for SAE Class I hitches to 2.5 inches for some SAE Class V hitches.

Holes 120 and 122 are configured on the vertical walls of the tubular body 114 and are aligned along the same axis. The holes 120 and 122 are configured to receive a retaining pin 124. The opening 118 receives the connecting member 126 of a trailer hitch attachment. Only the connecting member 126 of the trailer hitch attachment is depicted, as indicated by the broken line 128. Holes 130 and 132 are configured on the vertical walls of the connecting member 126 and are aligned along the same axis.

The connecting member 126 is sized to fit into the opening 118. The connecting member 126 is inserted into opening 118 and the holes 130 and 132 on connecting member 126 are aligned with the holes 120 and 122 on tubular body 114. The locking pin 124 is inserted through holes 120, 130, 132, and 122 to securely connect the receiver-type trailer hitch with the trailer hitch attachment.

Figure 2:
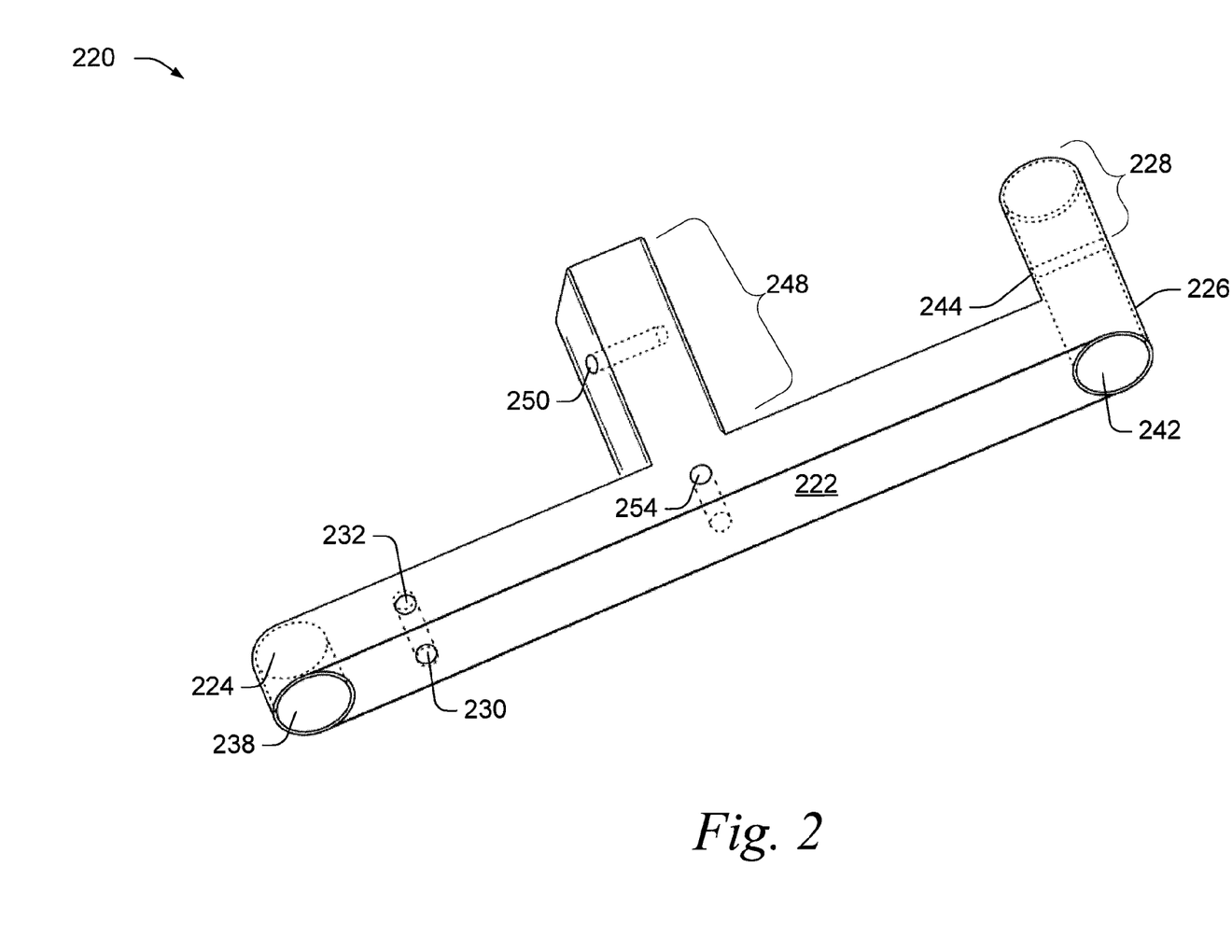
FIG. 2 illustrates a first implementation of the multifunction trailer hitch having a fixed-height ball mount point.

Turning to FIG. 2, one embodiment of multifunction trailer hitch 220 is depicted. Multifunction trailer hitch 220 includes several trailer-hitch connection points that allow the multifunction trailer hitch 220 to be connected to a vehicle in several configurations. In addition to providing several hitch connection points, each connection point may be rotated and connected to a trailer hitch in a different position to provide additional functionality. Multifunction trailer hitch 220 provides functions such as an umbrella holder, step, and tow-ball mount, but the present hitch may incorporate additional, optional functions, such a bicycle carrier mount, for example. In one embodiment, these functions are all provided in a single hitch device. In one embodiment, the hitch device includes only one of these functions. For example, a particular implementation of the present system may include only an umbrella holder and an elongated section configured to couple with a vehicle's receiver. In various embodiments, the hitch device includes two or more of these functions. In one embodiment, the multifunction trailer hitch includes a central member comprising a connecting member, an attachment point for a ball mount, and attachment points for mating with any number of preconfigured accessories.

As depicted, multifunction trailer hitch 220 includes elongated section 222. In one embodiment, elongated section 222 is formed from metal tubing. Elongated section 222 can formed, for example, using 2 inch by 2 inch carbon steel square tubing with a ⅛ inch sidewall. A first end 224 of the elongated section 222 is sized to fit into opening 118 of receiver 110 (see FIG. 1). In one embodiment, the first end 224 contains a channel 230 and a channel 232. In one embodiment, channel 230 is perpendicular to channel 232.

In one embodiment, channel 230 and channel 232 are positioned on the same plane. In another embodiment, channel 230 is positioned on a different plane from channel 232.

Channel 230 and channel 232 allow the first end 224 of multifunction trailer hitch 220 to be mounted to a receiver with circular channel 238 optionally being aligned horizontally or vertically. When inserted with the circular channel 238 in the horizontal position, channel 230 is used to receive the locking pin 124 (see FIG. 1). However, when inserted with the circular channel 238 in the vertical position, channel 232 is used to receive the locking pin 124 (see FIG. 1).

In the present implementation, the first end 224 contains a circular channel 238 and the end of first end 224 is rounded to conform to the circular channel 238. The circular channel 238, in addition to reducing the overall weight of multifunction trailer hitch 220 can be used as an attachment point for accessories, such as a bicycle carrier. In one embodiment, the first end 224 is formed without channel 238.

A second end 226 of elongated section 222 includes a tubular section 228 extending at a right angle and away from the front of elongated section 222. The tubular section 228 contains a circular channel 242. In one embodiment, tubular section 228 is sized to connect to and support an umbrella shaft. In one embodiment, tubular section 228 is sized to connect to and support a gas or charcoal grill. In one embodiment, tubular section 228 contains channel 244, which is located on each side of tubular section 228. In some implementations, an exterior surface of can be texturized to facilitate surface friction when that portion of the hitch device is used a step, for example to minimize slippage if a surface of the hitch should become wet or grimey.

When the first end 224 is attached to a receiver using channel 232 (e.g., with channel 238 in a vertical position within the receiver), an umbrella may be mounted directly to tubular section 228. In that case, if the outer dimensions of tubular section 228 are matched to (or less than) the interior dimensions of an umbrella shaft, the umbrella may be mounted to tubular section 228 by sliding the umbrella shaft over tubular section 228. Alternatively, if the interior dimension of tubular section 228 matches (or is greater than) the outer dimensions of an umbrella shaft, the umbrella shaft may be inserted into tubular section 228. In that case, a locking pin may be inserted through channel 244 to hold the umbrella shaft in channel 242, with the locking pin passing through the shaft of the umbrella.

In one orientation, first end 224 is inserted into the receiver such that tubular section 228 is oriented downwards. In that case, an umbrella shaft is inserted through channel 242. Again, an optional locking pin may be inserted through channel 244 to support the umbrella shaft within tubular section 228. In some implementations, the locking pin passes through the shaft of the umbrella to fix the umbrella to section 228.

In other implementations, first end 224 is inserted into the receiver such that tubular section 228 is oriented upwards (e.g., perpendicularly to a ground surface). In that case, an umbrella shaft can be inserted through channel 242, or, for umbrellas having shafts with a relatively large diameter, the shaft of the umbrella may be place around tubular section 228. In either case, a locking pin can be used to fix the umbrella to the hitch.

In the present system, any type of umbrella with an appropriately sized shaft may be used, including butterfly umbrellas, side post mounted umbrellas, or market umbrellas, or any other similar type of foldable or collapsible shelter.

The first end 224 may be attached to a receiver 110 so that the opening 242 of tubular section 228 extends directly back from the front of elongated section 222 (as orientated in FIG. 2), with channel 230 being oriented in a horizontal position. In this configuration, the combination of second end 226 and tubular section 228 may be used as a rear truck step. The elongated section 222 may be sized with a length appropriate to allow second end 226 and tubular section 228 to extend fully beyond an open tailgate of a truck or other vehicle. In that configuration, the multifunction trailer hitch 220 can be used as a step to enter the bed of a pickup truck or other elevated vehicle in which the back opens, such as a van or SUV with a liftgate. The multifunction trailer hitch may, therefore, provide a support at an intermediate height to allow for easier access to a truck bed even when the tailgate is lowered in the open position.

In one embodiment, the surface of the elongated section 222, second end 226 and tubular section 228 may be coated with an anti-slip material to provide enhanced friction when using the surface as a step.

In one embodiment, the end of second end 226 and the tubular section 228 are rounded to conform to the channel 242. The channel 242, in addition to reducing the overall weight of multifunction trailer hitch 220, can be used as an attachment point for accessories. For example, a bicycle carrier accessory can be mated with both channels 238 and 242 when member 248 is inserted into a receiver to provide a balanced and stable system for mounting and transporting one or more bicycles. Alternatively, the channels 238 and 242 may be square having the dimensions of a conventional trailer hitch receiver allowing attachment of a conventional receiver-type trailer hitch.

The multifunction trailer hitch 220 contains a receiver attachment member 248. The receiver attachment member 248 is positioned at the approximate midpoint of elongated section 222 along its length. The receiver attachment member 248 is sized to fit into opening 118 of receiver 110 (see FIG. 1, for example). The receiver attachment member 248 includes receiver mount channel 250. The receiver attachment member 248 is inserted into opening 118 of receiver 110 and a locking pin is passed through holes 120 and 122 of the receiver 110 and through channel 250 of receiver attachment member 248 to secure the multifunction trailer hitch 220 to the receiver-type trailer hitch. A tow ball mount channel 254 is formed through the elongated section 222. The tow ball mount channel 254 is sized to accept a conventional tow ball mount that may be used to tow a trailer. This configuration allows the multifunction trailer hitch 110 to function as a towing hitch. Load tests of one embodiment of multifunction trailer hitch 220, with a mounted tow ball and tested per SAE J684 in a towing configuration and where the receiver attachment member 248 was formed from 2 inch by 2 inch carbon steel tubing with a 3/16 inch side wall, was able to withstand 6000 lbf in tension.

In other implementations, the multifunction trailer hitch 220 may be constructed from any stiff material that provides sufficient strength to withstand the forces of towing, when configured as a towing hitch, and the weight of a person entering the back of the vehicle, when configured as a rear truck step. Such materials may include aluminum, steel, iron, titanium, stainless steel, carbon fiber, or other metals. The hitch can be formed from rigid tubing material, either formed as a cylinder, or as square tubing, in which case the edges of the square tubing may be rounded. Also, as long as the material is sufficiently strong for the application, the material used to fabricate hitch 220 may be formed in combinations of hollow and/or solid materials. In some cases, the first and second arms of the hitch, as described below, may include materials that are different than that of the center member. In one example implementation, the center member of the hitch is constructed from square steel tubing having a thickness of 3/16 inches, while the arms are formed from square steel tubing having a thickness of 1/8 inches. In other cases, the arms may be constructed from more lightweight materials (e.g., hollow structures, or lighter metals or materials), while the center member is constructed from stronger materials (e.g., solid structure, or stronger metals or materials) to provide sufficient strength while towing. In addition, the multifunction trailer hitch 220 may be constructed from a single piece of material or constructed from multiple components, of the same or different material, that are welded or otherwise integrated together to provide sufficient strength to withstand the uses described herein.

Figure 3:
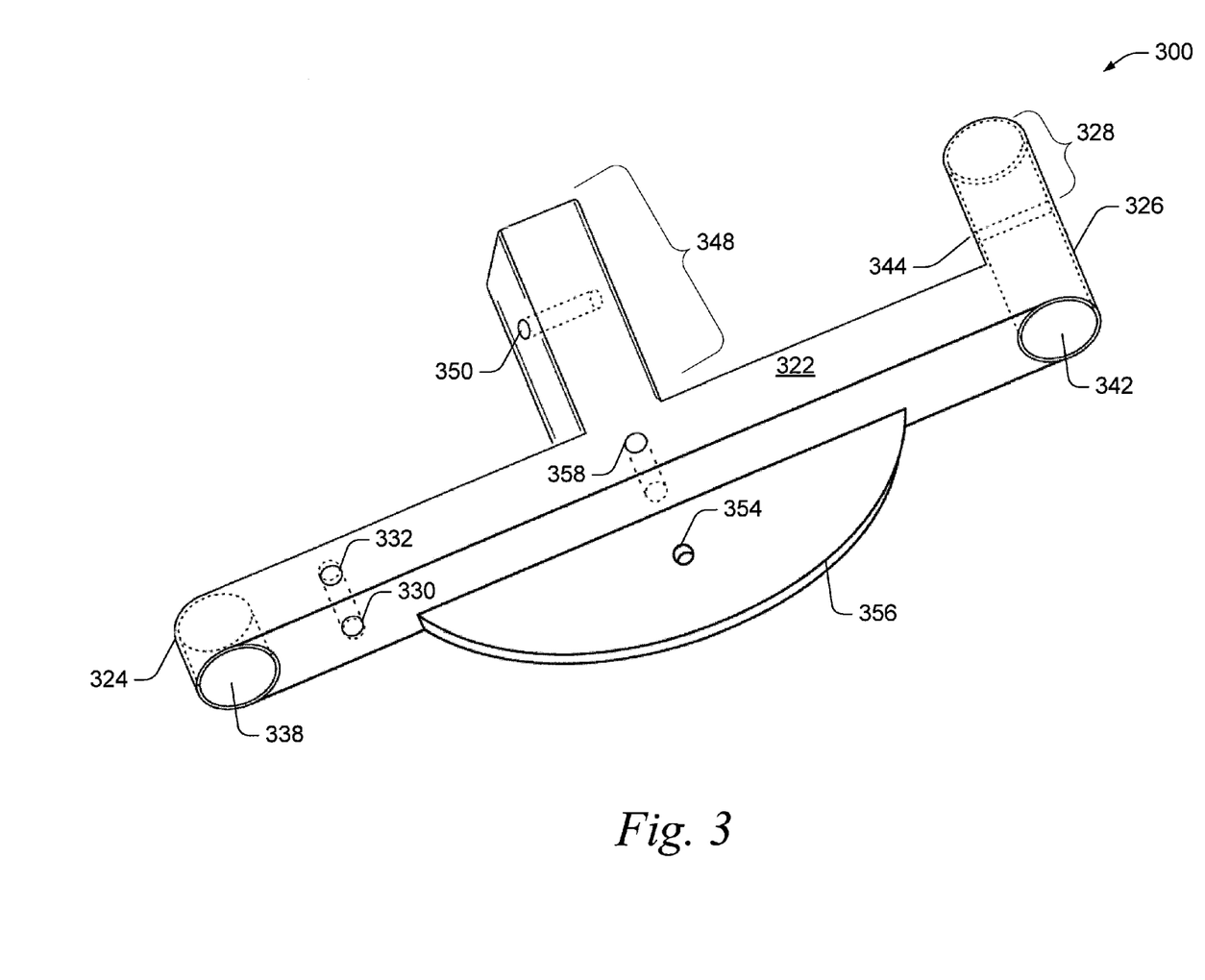
FIG. 3 illustrates a second implementation of the multifunction trailer hitch with a variable ball mount position.

Referring to FIG. 3, another embodiment of Applicant's multifunction trailer hitch 320 is depicted. The multifunction trailer hitch 320 consists of an elongated section 322. A first end 324 of the elongated section 322 is sized to fit into opening 118 of receiver 110 (see FIG. 1).

In one embodiment, first end 324 contains channel 330 and channel 332. In one embodiment, channel 330 and channel 332 are perpendicular. In one embodiment, channel 330 and channel 332 lie along the same plain. In one embodiment, channel 330 and channel 332 lie in different plains.

The combination of channel 330 and channel 332 allow the multifunction trailer hitch 320 to be mounted so channel 338 is aligned horizontally, but also allow the multifunction trailer hitch 320 to be rotated so that channel 338 is aligned vertically.

In the present embodiment, the first end 324 contains a channel 338 and the end of first end 324 is rounded to conform to the channel 338. In one embodiment, the channel 338, in addition to reducing the overall weight of multifunction trailer hitch 320 is used as an attachment point for accessories, such as a bicycle carrier. In one embodiment, the first end 324 does not contain a channel 338.

A second end 326 of elongated section 322 consists of a tubular section 328 extending at a right angle and back from the front of elongated section 322 (the orientation depicted in FIG. 3). The tubular section 328 contains a channel 342. The channel 342 is sized to connect to an umbrella shaft. In the present embodiment, the tubular section 328 also contains channel 344, which is configured to receive a locking pin. In one embodiment, the portion of tubular section 328 near the elongated section 322 is solid.

If the first end 324 is rotated and attached to a receiver 110 so that the channel 342 of tubular section 328 is aligned vertically with the tubular section extending upward, the channel 342 may act as an umbrella holder. In one embodiment, an umbrella with a shaft diameter less than the diameter of channel 342 may be inserted into channel 342. Any type of umbrella with an appropriately sized shaft may be used, including butterfly umbrellas or side post mounted umbrellas, or market umbrellas, or any other similar type of foldable or collapsible shelter. In one implementation, the umbrella shaft may fit into the channel 342. In another implementation, the umbrella shaft may fit over the tubular section 328. A locking pin passes through channel 344 and the corresponding holes in the umbrella shaft to secure the umbrella in an upright position. Alternatively, the first end 324 may be inserted into a receiver so that tubular section 328 is oriented downwards. In that case, an umbrella shaft may be inserted into channel 342. The optional locking pin may then be inserted through channel 344 to lock the umbrella in place, or to support the umbrella.

The first end 324 may be attached to a receiver 110 so that the channel 342 of tubular section 328 is aligned horizontally and the tubular section 328 extends directly back from the front of elongated section 322 (as orientated in FIG. 3). In this configuration, the combination of second end 326 and tubular section 328 may act as a rear truck step. In that case, the elongated section 322 is sized with a length appropriate to allow second end 326 and tubular section 328 to extend fully beyond an open tailgate of a truck or other vehicle. The multifunction trailer hitch 320 can be used as a step to enter the bed of a pickup truck or other elevated vehicle in which the back opens, such as a van or SUV with a liftgate. The height of the receiver-type trailer hitch is typically positioned beneath the tailgate or liftgate. The present configuration of the multifunction trailer hitch as a rear truck step therefore provides a support at an intermediate height to allow for easier access into the raised back of the vehicle. In addition, being sized to extend fully beyond an open tailgate, the rear truck step provides a support at an intermediate height to allow for easier access to a truck bed even when the tailgate is lowered in the open position. The surface of elongated section 322, second end 326, and tubular section 328 may be coated with an anti-slip material to provide enhanced friction when using the surface as a step.

In one embodiment, the end of second end 326 and the tubular section 328 are rounded to conform to the channel 342. The channel 342, in addition to reducing the overall weight of multifunction trailer hitch 320, can be used as an attachment point for accessories. For example, a bicycle carrier accessory can be mated with both channel 338 and channel 340 to provide a balanced and stable system for mounting and transporting one or more bicycles. In another embodiment, the second end 326 need not have a circular opening 340 and therefore the ability to attach accessories to second end 326 will not exist.

In another embodiment, the channels 338 and 342 are square having the dimensions of a conventional trailer hitch receiver. In this embodiment, conventional receiver-type trailer hitch accessories can be attached to channels 338 and 342.

The multifunction trailer hitch 320 also contains a receiver attachment member 348. The receiver attachment member 348 is positioned at the approximate midpoint of elongated section 322 along its length. The receiver attachment member 348 is sized to fit into opening 118 of receiver 110 (see FIG. 1). The receiver attachment member 348 includes channel 350, which is configured on the vertical portions of the receiver attachment member 348 and is aligned along the same horizontal axis. The receiver attachment member 348 is inserted into opening 118 or receiver 110 and a locking pin 124 is passed through holes 120 and 122 of the receiver 110 and through channel 350 of receiver attachment member 348 to secure the multifunction trailer hitch 320 to the receiver-type trailer hitch.

A tow ball mount 358 is configured along the top of elongated section 322. The tow ball mount 358 is sized to accept a conventional tow ball mount that may be used to tow a trailer. Upon attaching a tow ball mount in tow ball mount 358, this configuration allows the multifunction trailer hitch 110 to function as a towing hitch.

A curved section 356 is mounted to the front of elongated section 322. The curved section 356 is offset downward from the centerline of the front of elongated section 322. A tow ball mount 354 is configured along the top of curved section 356. The tow ball mount 354 is sized to accept a conventional tow ball mount that may be used to tow a trailer. Upon attaching a tow ball mount in tow ball mount 354, this configuration allows the multifunction trailer hitch 110 to function as a towing hitch.

The multifunction trailer hitch 110 may be rotated 180 degrees and attached to receiver 110, in the same manner as described above, so that the curved section 356 is offset upward from the center line of the front of elongated section 322. A tow ball may be attached to the tow ball mount 354 and used to tow a trailer. Depending on the configuration, either as shown in FIG. 3 or rotated 180 degrees so the curved section 356 is toward the upper portion of the front of elongated section 322, two different tow ball heights are possible.

Figure 5:
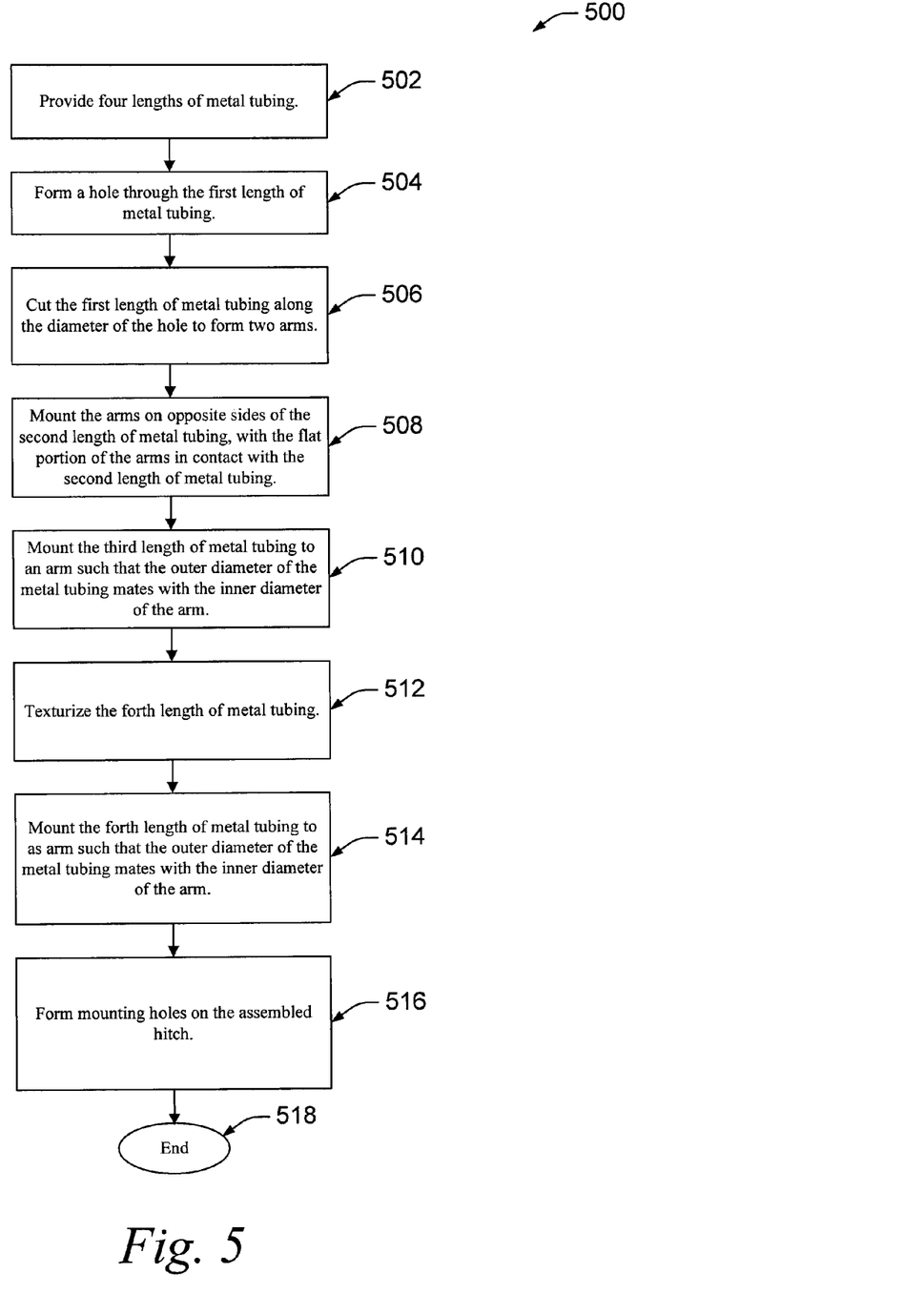
FIG. 5 is a flowchart depicting an exemplary method of making Applicant's multifunction hitch.

FIG. 5 is a flowchart illustrating an exemplary method 500 of manufacturing the present hitch. Four lengths of metal tubing are provided at step 502. In one embodiment, the first length of metal tubing is 2 inch by 2 inch carbon steel square tubing. In one embodiment, the second length of metal tubing is 2 inch by 2 inch carbon steel tubing with a 3/16 inch sidewall. In one embodiment, the third and four length of metal tubing is 1¾ outer diameter carbon steel round tubing with a 1/16 inch sidewall. While the various members are described as "metal tubing", in different embodiments, the tubing may be made of any other material sufficient to withstand the forces encountered during the uses described herein. For example, in different embodiments, the various members are constructed from other metals, such as aluminum, or non-metals, such as various rigid plastics. Similarly, the members may be solid or hollow having dimensions sufficient, based on the material used, to withstand the forces encountered during the uses described herein.

Figures 4A, 4B:
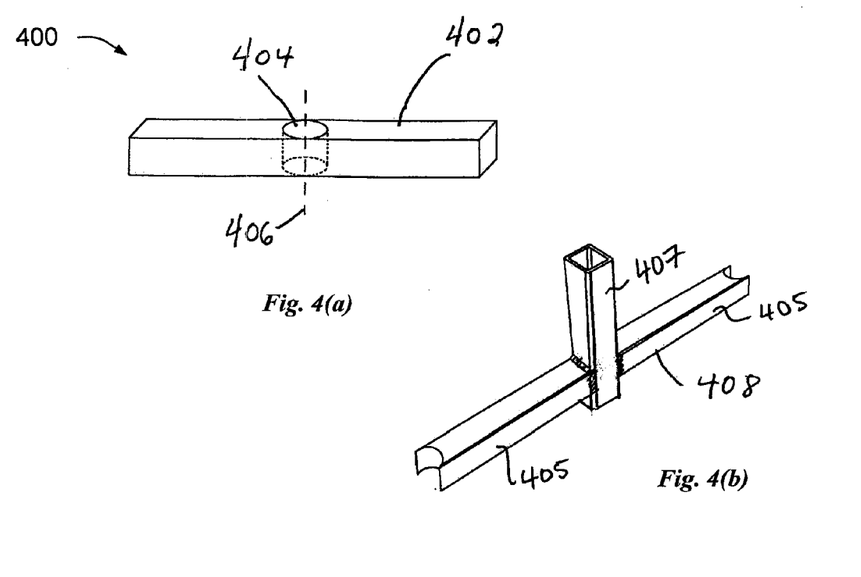
FIGS. 4a-4d illustrates the various components of one embodiment of Applicant's multifunction hitch.

A hole is formed in the first length of metal tubing at step 504. In one embodiment, the first length of metal tubing is about 24 inches long. The hole is formed at the midpoint along the length of the metal tubing. Referring to FIG. 4*a*, an example length of tubing 402 is depicted. A hole 404 if formed at the midpoint of tubing 402.

At step 506, the first length of metal tubing is cut along the diameter of the hole formed in the previous step. The result is two arms each with a half-circle cutout on one end. Turning again to FIG. 4*a*, a cut line 406 shows the line along which the length of tubing 402 is cut.

Figures 4C, 4D:
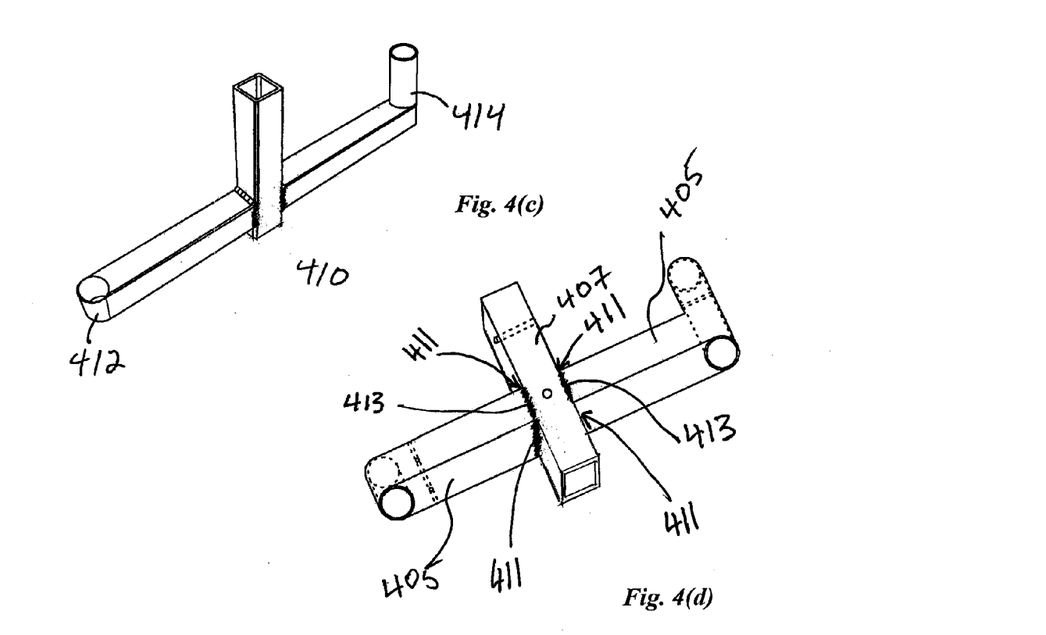

The arms are mounted to opposite sides of the second length of metal tubing 407 at step 508. The arms are mounted such that the end of each arm opposite to the half-circle cutout is in contact with the second length of metal tubing. As shown in FIG. 4*b*, the assembly 408 of the arms with the second length of tubing is depicted. In some implementations, second length 407, as shown in FIG. 4*b*, protrudes past the two arms 405 to facilitate welding of the two arms 405 to length 407. Referring to the finished device in FIG. 4*d*, by allowing a portion of the second length 407 to protrude past the two arms, additional welds can be formed between the components resulting in a stronger hitch device. As shown in FIG. 4*d*, welds 411 can be formed along the side surfaces between second length 407 and the two arms with complementary welds (not shown) being formed on the opposite sides of the two arms 405. Additionally, optional welds 413 formed along a top surface and a lower surface (not shown) can be formed between second length 407 and arms 405 to further strengthen the device.

The third length of metal tubing is mounted to one of the first arms at step 510. The third length of metal tubing is disposed within the half-circle cutout portion of the arm as illustrated by element 412 of FIG. 4*c*.

Figure 6:
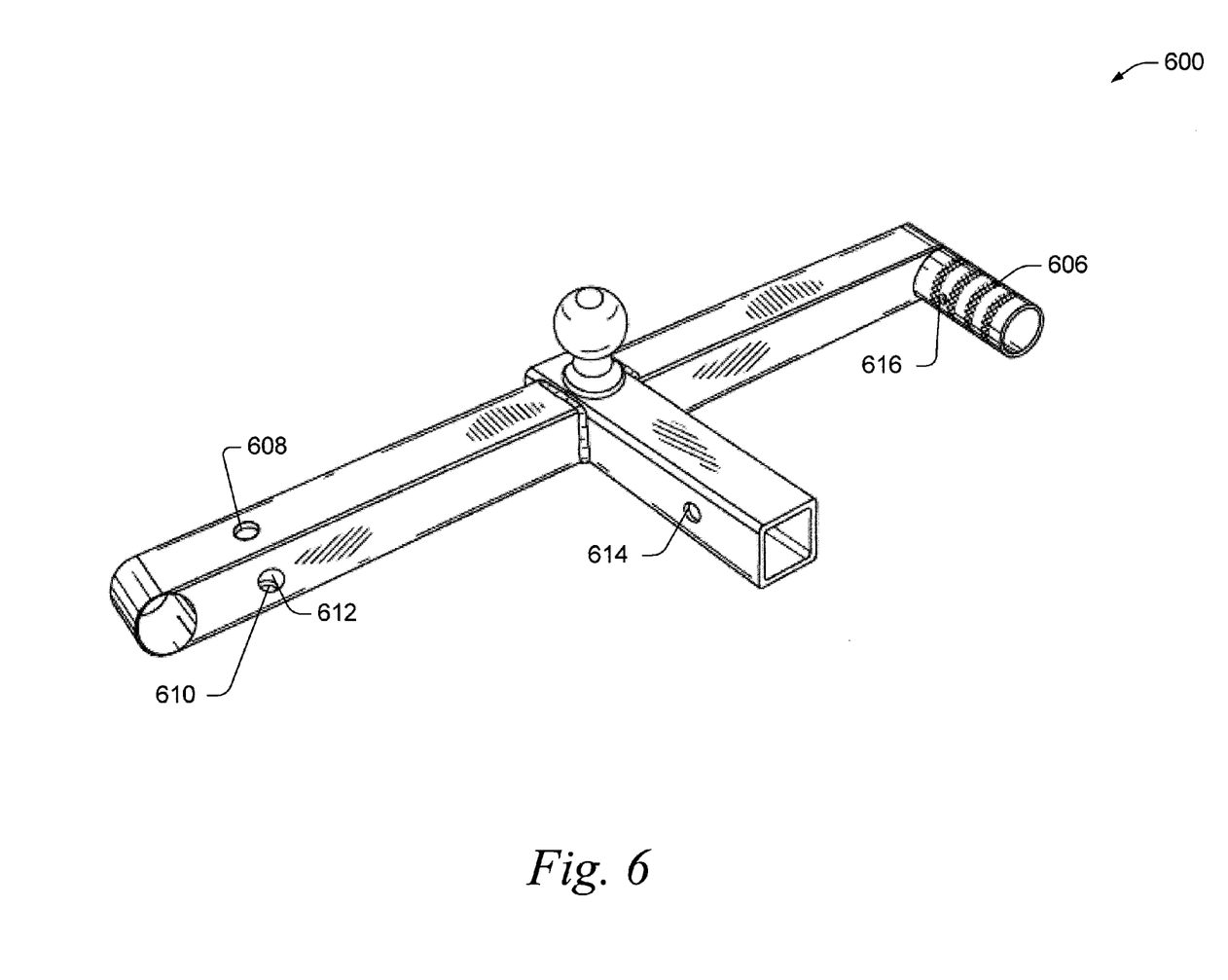
FIG. 6 is a three-quarter perspective view of the multifunction trailer hitch.

The fourth length of metal tubing is texturized at step 512. The texturization aids in handling the multifunction trailer hitch, by adding a roughened surface to increase friction (for example, when the tubing is used as a step), as well as adding aesthetic appeal. The texturization are depicted as 606 of FIG. 6.

The forth length of metal tubing is mounted to a second arm at step 514. The third length of metal tubing is disposed within the half-circle cutout portion of the arm, as illustrated by element 414 of FIG. 4*c*.

Mounting holes are formed on the multifunction trailer hitch at step 316 to form mounting channels. The mounting holes are depicted as 608, 610, 612, and 614 of FIG. 6. The method ends at 518.

While one or more embodiments of the present invention have been illustrated in detail, the skilled artisan will appreciate that modifications and adaptations to those embodiments may be made without departing from the scope of the present invention as set forth in the following claims.

What is claimed is:

1. A hitch, comprising:
    a center member having a first end configured to mount to a receiver of a vehicle;
    a tow ball coupled proximate to a second end of the center member;
    a first arm having a first end permanently fixed to the second end of the center member, the first arm having a second end being configured to mount to and fit within the receiver of the vehicle, the second end of the first arm including a first receiver mount channel for receiving a locking pin running through the first receiver mount channel parallel to the center member to secure the second end of the first arm to the receiver of the vehicle and a second receiver mount channel for receiving the locking pin running through the second receiver mount channel perpendicular to the center member to secure the second end of the first arm to the receiver of the vehicle, the first and second receiver mount channels for mounting the second end of the first arm to the receiver in first and second mounting positions, wherein:
        when the second end of the first arm is mounted to the receiver in the first mounting position, the center member is positioned parallel to a ground surface and the first receiver mount channel is configured to receive the locking pin, and
        when the second end of the first arm is mounted to the receiver in the second mounting position, the center member is positioned perpendicular to the ground surface and the second receiver mount channel is configured to receive the locking pin;
    a second arm having a first end permanently fixed to the second end of the center member; and
    a tubular accessory mount permanently fixed to a second end of the second arm, the tubular accessory mount having a roughened outer surface and a length, the length of the tubular accessory mount being parallel to the center member, the tubular accessory mount configured to provide a step when the first arm is mounted to the receiver in the first mounting position and configured to receive a portion of a shaft of an umbrella when the first arm is mounted to the receiver in the second mounting position.

2. The hitch of claim 1, further comprising an accessory mount channel formed in the accessory mount for receiving an accessory locking pin to secure the umbrella to the hitch.

3. The hitch of claim 1, wherein the center member is configured to fit over the receiver.

4. The hitch-mounted device of claim 1, wherein the center member is configured to fit within the receiver.

5. The hitch of claim 1, wherein:
    the center member comprises approximately 2 inch by approximately 2 inch square tubing; and
    the first arm and second arm comprise approximately 2 inch by approximately 2 inch square tubing.

6. A method of making a hitch, comprising:
    forming a hole through a first length of square tubing, the hole having a diameter;
    cutting the first length of square tubing along the diameter of the hole to form a first arm having a half-circle cutout at a first end and a second arm having a half-circle cutout at a first end;
    permanently fixing a second end of the first arm to a first end of a center member, the center member being sized to mount to a receiver of a vehicle;
    permanently fixing a second end of the second arm to the first end of the center member;
    permanently fixing a first length of cylindrical tubing to the first end of the first arm, a diameter of the first length of cylindrical tubing being approximately the same as the diameter of the hole at the first end of the first arm and a length of the first length of cylindrical tubing being approximately the same as a thickness of the square tubing;
    permanently fixing a second length of cylindrical tubing to the first end of the second arm, a diameter of the second length of cylindrical tubing being approximately the same as the diameter of the hole at the first end of the second arm and a length of the first length of cylindrical tubing being greater than the thickness of the square tubing; and texturizing a surface of the second length of cylindrical tubing.

7. The method of claim 6, further comprising connecting a tow ball mount to the center member.

8. The method of claim 6, further comprising:

forming a first receiver mount channel in the center member;

forming a second receiver mount channel in the first arm; and forming a third receiver mount channel in the first arm.

9. The method of claim 6, wherein the center member comprises approximately 2 inch by approximately 2 inch square tubing.

* * * * *